(12) United States Patent
Ohnuma et al.

(10) Patent No.: US 8,918,604 B2
(45) Date of Patent: Dec. 23, 2014

(54) INFORMATION PROCESSING APPARATUS, INFORMATION PROCESSING METHOD, PROGRAM, AND RECORDING MEDIUM

(75) Inventors: Kensuke Ohnuma, Tokyo (JP); Koichi Chotoku, Tokyo (JP); Toshiyuki Katsumoto, Tokyo (JP); Shinichiro Sugai, Saitama (JP)

(73) Assignee: Sony Corporation, Tokyo (JP)

( * ) Notice: Subject to any disclaimer, the term of this patent is extended or adjusted under 35 U.S.C. 154(b) by 99 days.

(21) Appl. No.: 13/148,517

(22) PCT Filed: Feb. 10, 2010

(86) PCT No.: PCT/JP2010/051913
§ 371 (c)(1),
(2), (4) Date: Aug. 9, 2011

(87) PCT Pub. No.: WO2010/095543
PCT Pub. Date: Aug. 26, 2010

(65) Prior Publication Data
US 2011/0320752 A1     Dec. 29, 2011

(30) Foreign Application Priority Data

Feb. 18, 2009   (JP) ................ P2009-035131

(51) Int. Cl.
*G06F 21/64* (2013.01)
*G06F 21/33* (2013.01)
*H04L 29/06* (2006.01)
*G06F 21/62* (2013.01)

(52) U.S. Cl.
CPC .......... *H04L 63/168* (2013.01); *H04L 63/0823* (2013.01); *G06F 21/6218* (2013.01); *H04L 63/0853* (2013.01)

USPC ............................. 711/161; 711/E12.103

(58) Field of Classification Search
CPC .................. G06F 21/33; G06F 21/64
See application file for complete search history.

(56) References Cited

U.S. PATENT DOCUMENTS

| 7,536,420 B2 | 5/2009 | Takashima | |
|---|---|---|---|
| 2005/0138401 A1* | 6/2005 | Terao et al. | 713/189 |
| 2006/0047954 A1* | 3/2006 | Sachdeva et al. | 713/165 |
| 2007/0247985 A1* | 10/2007 | Ueda et al. | 369/47.1 |

(Continued)

FOREIGN PATENT DOCUMENTS

| JP | 2004-213201 A | 7/2004 |
|---|---|---|
| JP | 2005-117277 A | 4/2005 |

(Continued)

*Primary Examiner* — Charles Rones
*Assistant Examiner* — Tian-Pong Chang
(74) *Attorney, Agent, or Firm* — Sony Corporation

(57) ABSTRACT

An information processing apparatus, an information processing method and a program may provide that information to be processed by an application program recorded on a recording medium can be taken over and used by an application program recorded on a different recording medium. The application program serving as a content, a first root certificate issued to the application program, and a second root certificate issued before the first root certificate is issued to the application program may be recorded on the recording medium. The information processing apparatus, which executes the application program, creates, in the memory, a first folder for storing data to be processed by the application program, the first folder associated with the first root certificate; and copies data stored in a second folder, the second folder associated with the second root certificate, to the first folder in a case where the second folder exists in the memory.

12 Claims, 18 Drawing Sheets

(56) References Cited

U.S. PATENT DOCUMENTS

| | | | |
|---|---|---|---|
| 2007/0286575 A1* | 12/2007 | Oashi et al. | 386/95 |
| 2009/0202071 A1* | 8/2009 | Kato | 380/201 |
| 2009/0204825 A1 | 8/2009 | Takashima | |
| 2009/0222674 A1 | 9/2009 | Leichsenring et al. | |
| 2010/0031347 A1* | 2/2010 | Ohto | 726/19 |
| 2010/0046747 A1 | 2/2010 | Oashi et al. | |
| 2010/0049992 A1 | 2/2010 | Leichsenring et al. | |

FOREIGN PATENT DOCUMENTS

| | | |
|---|---|---|
| JP | 2007-150587 A | 6/2007 |
| JP | 2008-507793 A | 3/2008 |
| JP | 2008-084445 A | 4/2008 |
| JP | 2010-005159 A | 1/2010 |
| WO | 2006-085647 A1 | 8/2006 |

* cited by examiner

FIG. 6

| COMMUNICATION RECORD ID (231) | EXPIRATION DATE (232) |
|---|---|
| 4fd39d | 12/1/2008 |

FIG. 7

| COMMUNICATION RECORD ID (241) | USER ID (242) | CODE OF ITEM TO BE PURCHASED (243) |
|---|---|---|
| 4fd39d | tanakasayoko | 4201, 4210 |
| e2a913 | yamadatakashi | |
| 2103c9 | satonaoko | 3210, 1109, 2211 |

FIG. 13

| Image of item | Item code | Item | Size | Unit price | Number of items |
|---|---|---|---|---|---|
| | 04201 | Non-iron shirt | L | ¥1,500 | 2 |
| | 05344 | Premium down jacket | L | ¥6,100 | 1 |

List of items to be purchased

Total price of items: ¥7,600
Delivery charge: ¥500

Total: ¥8,100

Call us at the following telephone number to tell us item codes and the number of items.
0120-XXX-XXX
Please login if you prefer buy online.

Login

INFORMATION PROCESSING APPARATUS, INFORMATION PROCESSING METHOD, PROGRAM, AND RECORDING MEDIUM

CROSS-REFERENCES TO RELATED APPLICATIONS

The present application is a national phase entry under 35 U.S.C. §371 of International Application No. PCT/JP2010/051913 filed Feb. 10, 2010, published on Aug. 26, 2010 as WO 2010/095543A1, which claims priority from Japanese Patent Application No. JP 2009-035131 filed in the Japanese Patent Office on Feb. 18, 2009.

TECHNICAL FIELD

The present invention relates to information processing apparatuses, information processing methods, programs, and recording media. Particularly, the present invention relates to an information processing apparatus, an information processing method, a program, and a recording medium that are preferably used in the case of reading and executing an application program described using BD-J (Blu-ray Disc JAVA (registered trademark)) recorded on a BD (Blu-ray Disc) (registered trademark), for example.

BACKGROUND ART

Packaged media using conventional recording media represented by DVDs (digital versatile discs), CDs (compact discs), etc., merely have AV data or the like of movies etc. recorded thereon as content.

In contrast, as for some packaged media using BDs, AV data of movies etc. is recorded thereon as content, and also an application program described using BD-J (Blu-ray Disc JAVA (registered trademark)) is recorded thereon.

Here, the BD-J is capable of providing an interactive service to a user, and a BD player for playing back a BD is required to be compatible with the BD-J.

Furthermore, if a BD player can be connected to the Internet, an interactive service can be provided to a user by connecting to a certain server. Specifically, for example, an application program that provides an online shopping service in response to access to a certain server via the Internet is assumed. The BDs having this application program recorded thereon may be distributed as a shopping catalog.

Meanwhile, generally, in a case where a user uses an online shopping service, the user needs to input a user ID and a password or the like every time the user uses the service (every time the user logins).

However, a typical BD player is not provided with a keyboard, which is provided in a personal computer, and thus inputting them is a very complicated and troublesome task for the user.

To date, in order to reduce such troublesomeness for the user, there has been suggested a method for managing session information using a method similar to cookies used in an Internet browser, such as the method according to PTL 1 of controlling a storage region of a BD player using a root certificate recorded on a BD.

CITATION LIST

Patent Literature

PTL 1: Japanese Unexamined Patent Application Publication No. 2007-150587

SUMMARY OF INVENTION

Technical Problem

However, in the existing method for managing session information using a root certificate recorded on a BD as described in PTL 1, information that was generated before, such as session information, cannot be taken over if the root information recorded on the BD is changed.

For example, assume that, in a case where BDs serving as shopping catalogs are updated every season and are distributed, a user who used a spring-version shopping catalog will use a summer-version shopping catalog that is newly distributed. In this case, if the root certificate recorded on the summer-version BD is a root certificate updated from that of the spring-version BD, communication record information stored during the use of the spring version is not taken over to the summer version, which makes it necessary for the user to re-input a user ID etc.

The present invention has been made in view of such circumstances, and is directed to enabling information processed by an application program recorded on a recording medium to be taken over and be used by an application program recorded on a different recording medium.

Solution to Problem

An information processing apparatus according to a first aspect of the present invention is an information processing apparatus that reads an application program from a recording medium on which at least the application program serving as content, a first root certificate that is issued to the application program, and a second root certificate that is issued before the first root certificate is issued to the application program are recorded and that executes the application program. The information processing apparatus includes creation means for creating, in a memory, a first folder for storing data to be processed by the application program, the first folder being associated with the first root certificate, and copying means for copying data stored in a second folder, the second folder being associated with the second root certificate, to the first folder in a case where the second folder exists in the memory.

The information processing apparatus according to the first aspect of the present invention may further include hash value derivation means for deriving hash values from the first and second root certificates recorded on the recording medium.

The creation means may create, in the memory, the first folder associated with the hash value derived from the first root certificate. The copying means may copy the data stored in the second folder to the first folder in a case where the second folder associated with the hash value derived from the second root certificate exists in the memory.

A first hash value corresponding to the first root certificate and a second hash value corresponding to the second root certificate may be further recorded on the recoding medium. The creation means may create, in the memory, the first folder associated with the hash value derived from the first root certificate in a case where the hash value derived from the first root certificate is equal to the first hash value recorded on the recording medium. The copying means may copy the data stored in the second folder to the first folder in a case where the hash value derived from the second root certificate is equal to the second hash value recorded on the recording medium and where the second folder associated with the hash value derived from the second root certificate exists in the memory.

The memory may be a built-in memory provided in the information processing apparatus.

The memory may be an external memory that is removably loaded into the information processing apparatus.

The copying means may copy, to the first folder, only a piece of the data stored in the second folder having a file name different from the data stored in the first folder in a case where the second folder associated with the second root certificate exists in the memory.

A plurality of different second root certificates may be recorded on the recording medium. The copying means may copy, in a case where a plurality of second folders associated with the plurality of different second root certificates exist in the memory, the data stored in the plurality of second folders to the first folder.

An information processing method according to the first aspect of the present invention is an information processing method for an information processing apparatus that reads an application program from a recording medium on which at least the application program serving as content, a first root certificate that is issued to the application program, and a second root certificate that is issued before the first root certificate is issued to the application program are recorded and that executes the application program. The information processing method includes a creation step of creating, in a memory, a first folder associated with the first root certificate in order to store data to be processed by the application program, and a copying step of copying data stored in a second folder, the second folder being associated with the second root certificate, to the first folder in a case where the second folder exists in the memory.

A program according to the first aspect of the present invention is a program for controlling an information processing apparatus that reads an application program from a recording medium on which at least the application program serving as content, a first root certificate that is issued to the application program, and a second root certificate that is issued before the first root certificate is issued to the application program are recorded and that executes the application program. The program causes a computer of the information processing apparatus to execute a process including a creation step of creating, in a memory, a first folder associated with the first root certificate in order to store data to be processed by the application program, and a copying step of copying data stored in a second folder, the second folder being associated with the second root certificate, to the first folder in a case where the second folder exists in the memory.

A recording medium according to a second aspect of the present invention is a recording medium on which an application program serving as content, a first root certificate that is issued to the application program, and a second root certificate that is issued before the first root certificate is issued to the application program are recorded.

The recording medium according to the second aspect of the present invention may have a first hash value corresponding to the first root certificate and a second hash value corresponding to the second root certificate further recorded thereon.

In the first aspect of the present invention, data to be processed by the application program is stored. Thus, the first folder associated with the first root certificate is created in the memory. In a case where the second folder associated with the second root certificate exists in the memory, the data stored in the second folder is copied to the first folder.

Advantageous Effects of Invention

According to the information processing apparatus, the information processing method, and the program according to the first aspect of the present invention, information to be processed by an application program recorded on a recording medium can be taken over and used by an application program recorded on a different recording medium.

Also, according to the information processing apparatus, the information processing method, and the program according to the first aspect of the present invention, even after a root certificate recorded on a recording medium has been updated, information to be processed by the application program recorded on the recording medium can be taken over and used.

According to the recording medium according to the second aspect of the present invention, a past root certificate that is necessary for reading information processed by the application program recorded on a different recording medium can be supplied to an information processing apparatus.

BRIEF DESCRIPTION OF DRAWINGS

FIG. 6 is a diagram illustrating an example of a communication record file.

FIG. 7 is a diagram illustrating an example of a communication record list.

FIG. 13 is a diagram illustrating an example display of a list-of-items-to-be-purchased screen.

DESCRIPTION OF EMBODIMENTS

Hereinafter, the best mode for carrying out the invention (hereinafter referred to as an embodiment) will be described in detail with reference to the drawings.

<1. Embodiment>
[Example Configuration of BD Player]

Figure 1:
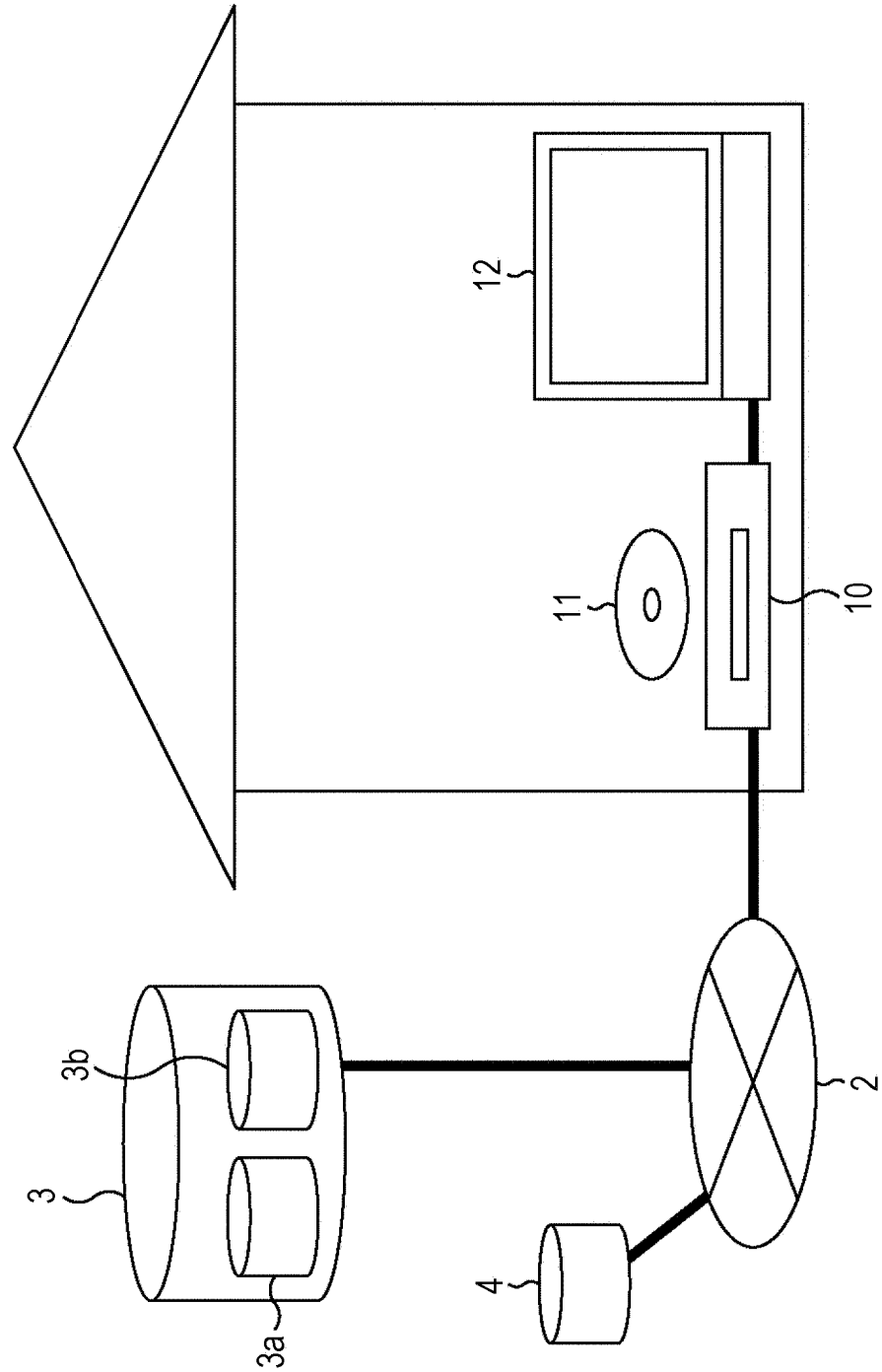
FIG. 1 is a diagram illustrating an example configuration of a system including a BD player to which the present invention is applied.

FIG. 1 illustrates an example configuration of a system including a BD player according to an embodiment of the present invention.

The BD player 10 decodes a video/audio stream recorded on a BD 11 loaded thereinto, and outputs a resulting video signal and audio signal to a television receiver (TV) 12. Also, the BD player 10 executes an application program recorded on the BD 11, thereby connecting to an online shopping server 3 via a network 2 represented by the Internet and providing a service of online shopping to a user.

The online shopping server 3 includes an item database 3a that holds information about items and a customer database 3b that holds information about customers. Note that a settlement server 4 is used for settlement of online shopping.

Figure 2:
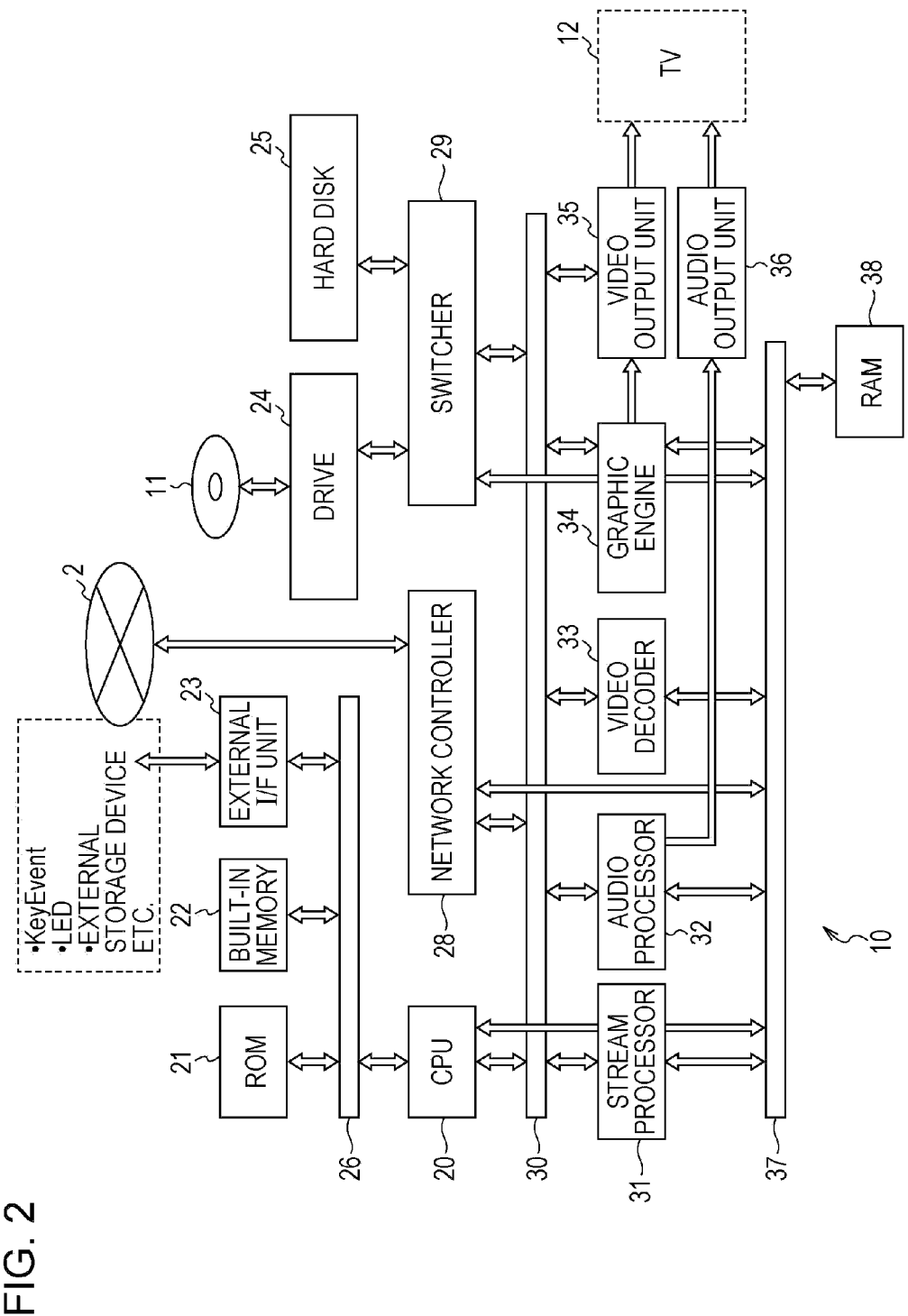
FIG. 2 is a block diagram illustrating an example configuration of the BD player to which the present invention is applied.

FIG. 2 illustrates an example configuration of the BD player 10.

The BD player 10 includes a CPU 20. A ROM 21, a built-in memory 22, and an external I/F unit 23 are connected to the CPU 20 via an input/output bus 26. Furthermore, a RAM 38 is connected to the CPU 20 via a memory bus 37.

Also, a network controller 28, a switcher 29, a stream processor 31, an audio processor 32, a video decoder 33, and a graphic engine 34 are connected to the CPU 20 via a system bus 30.

The CPU 20 loads various programs (described below with reference to FIG. 3) recorded on the ROM 21 in advance to the RAM 38 and executes them, thereby controlling the individual units of the BD player 10. Also, the CPU 20 loads the application program (corresponding to the external application 51 in FIG. 3) recorded on the BD 11 to the RAM 38 and executes it, thereby providing a service of online shopping to a user.

The built-in memory 22 is constituted by a nonvolatile recording medium, such as a flash memory. The built-in memory 22 is provided with a folder corresponding to a root certificate recorded on the BD 11, and a communication record file or the like concerning the online shopping server 3 is recorded in the folder. An external storage device, such as a USB memory, may be connected to the external I/F unit 23. Alternatively, the communication record file or the like concerning the online shopping server 3 may be recorded on the external storage device instead of the figure memory 22.

The network controller 28 controls data communication performed with a server or the like connected via the network 2. The switcher 29 controls a drive 24 that reads various types of data from the loaded BD 11, and input/output of data to/from a hard disk 25.

The stream processor 31 decrypts an encrypted video/audio stream 82 (FIG. 4) that is read from the BD 11 and is input via the system bus 30, outputs resulting audio data to the audio processor 32, and outputs video data to the video decoder 33. The audio processor 32 decodes the audio data input thereto to generate an audio signal. The generated audio signal is supplied to the television receiver 12 via an audio output unit 36. The video decoder 33 decodes the video data input thereto to generate a video signal. The generated video signal is supplied to the television receiver 12 via the graphic engine 34 and a video output unit 35. Note that an operation screen or the like of the application program recorded on the BD 11 is drawn on the RAM 38 and is then supplied to the television receiver 12 via the graphic engine 34 and the video output unit 35.

Figure 3:
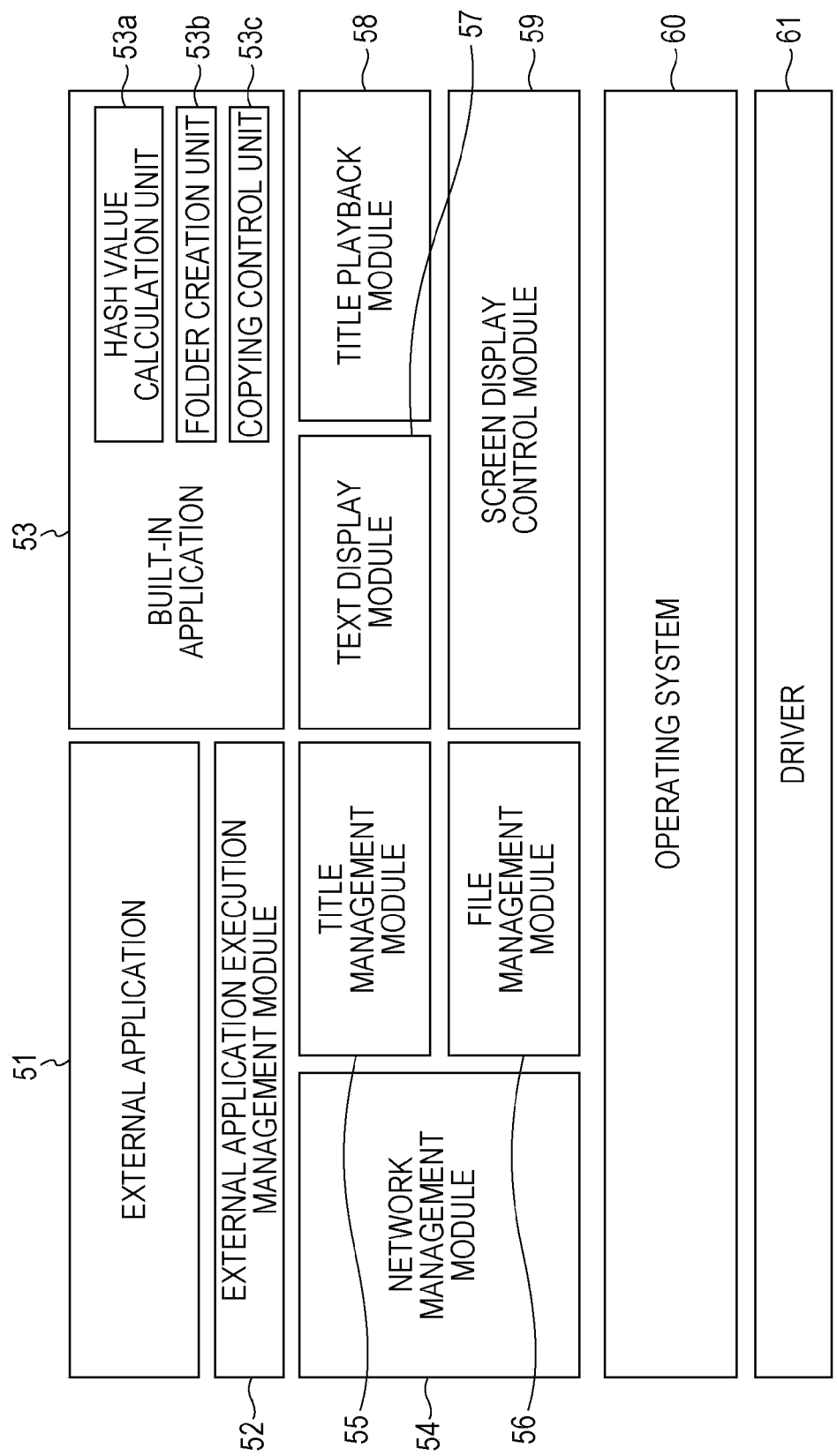
FIG. 3 is a diagram illustrating various programs executed by a CPU of the BD player.

Next, FIG. 3 illustrates a configuration of various programs executed by the CPU 20.

The external application 51 corresponds to the application program recorded on the BD 11. The external application 51 is described using the BD-J. Note that an external application execution management module 52 through a driver 61 other than the external application 51 are recorded on the ROM 21 in advance.

The external application execution management module 52 corresponds to a Java (registered trademark) VM (Virtual Machine), and substantially controls the individual units of the BD player 10 on the basis of the external application 51 described using the BD-J.

A built-in application 53 provides a GUI (Graphical User Interface) serving as a main body of the BD player 10. Also, the built-in application 53 includes a hash value derivation unit 53a, a folder creation unit 53b, and a copying control unit 53c.

The hash value derivation unit 53a derives a hash value corresponding to a root certificate recorded on the BD 11. The folder creation unit 53b creates a folder corresponding to the derived hash value in the built-in memory 22. Data to be processed by the external application 51 recorded on the BD 11 (a communication record file concerning the online shopping server 3, etc.) is recorded in the created folder. The copying control unit 53c controls copying of data between folders in the built-in memory 22.

A network management module 54 controls data communication performed by the network controller 28 via the network 2. A title management module 55 manages a title (content) recorded on the BD 11. Also, the title management module 55 controls a file existing on an operating system 60 via a file management module 56.

A text display module 57 controls text drawing on the basis of an instruction provided from the built-in application 53. A title playback module 58 controls playback of a title (content) recorded on the BD 11.

A screen display control module 59 combines all drawing requests, including video of a title (content) and text display, determines an image that is to be actually displayed, and performs drawing.

The operating system 60 controls the individual units of the BD player 10 using the driver 61. Also, the operating system 60 executes resource management of the external application 51 through the screen display control module 59.

[Example of Data Recorded on Conventional BD]

Figure 4:
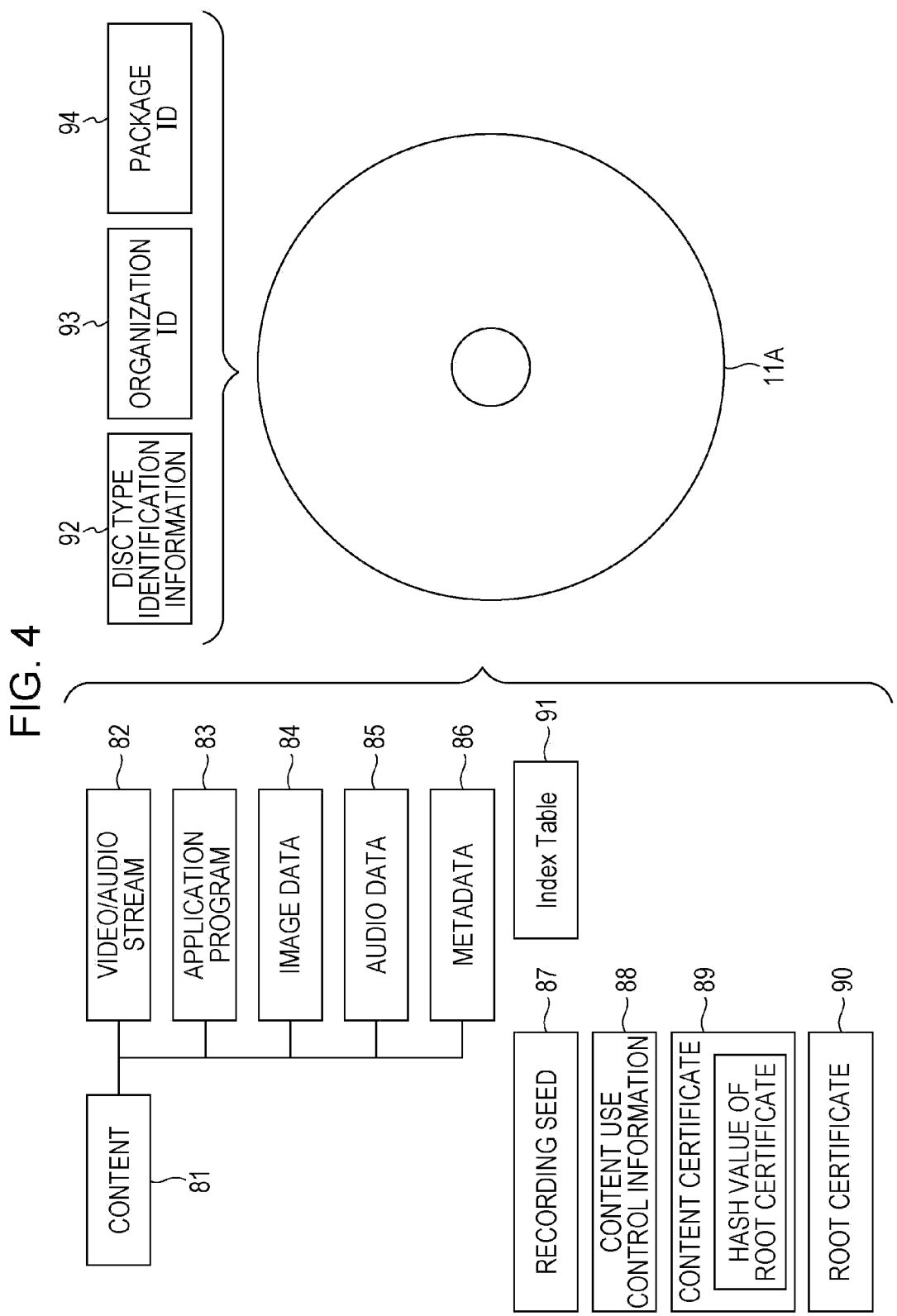
FIG. 4 is a diagram illustrating data recorded on a conventional BD.

Next, FIG. 4 illustrates an example of data stored in a conventional BD 11 (hereinafter referred to as BD 11A) to which the recording medium of the present invention is not applied.

The BD 11A stores content 81. The content 81 includes the video/audio stream 82 of movies or the like, an application program 83 for online shopping described using the BD-J, image data 84 and audio data 85 that are referred to by the application program 83, and metadata representing various types of information, such as the prices of items of online shopping. Note that a plurality of pieces of content (titles) 81 may be stored in the BD 11A.

The BD 11A further stores a recording seed 87, content use control information 88, a content certificate 89, a root certificate 90, and an index table 91.

The recording seed 87 is used for generating a key that is necessary for decrypting encryption performed on the content 81. The content use control information 88 includes copying control information and playback control information corresponding to the content 81.

The content certificate 89 includes information for verifying the validity of the content 81 (hash value or the like), the hash value of the root certificate 90, etc.

The root certificate 90 is a public key certificate that is issued by a third organization to the application program 83. As described above, the hash value that is uniquely derived from the root certificate 90 is included in the content certificate 89.

In a case where a plurality of pieces of content (titles) 81 are stored in the BD 11A, the playback order thereof is defined in the index table 91.

Furthermore, the BD 11A stores disc type identification information 92 for identifying the disc type of the BD 11A, an organization ID 93 for identifying the organization that edits the content 81, and a package ID 94 for identifying a manufacture package. The BD 11A is individually identified by the disc type identification information 92, the organization ID 93, and the package ID 94.

[Hierarchical Structure of Folders in Built-In Memory]

Figure 5:
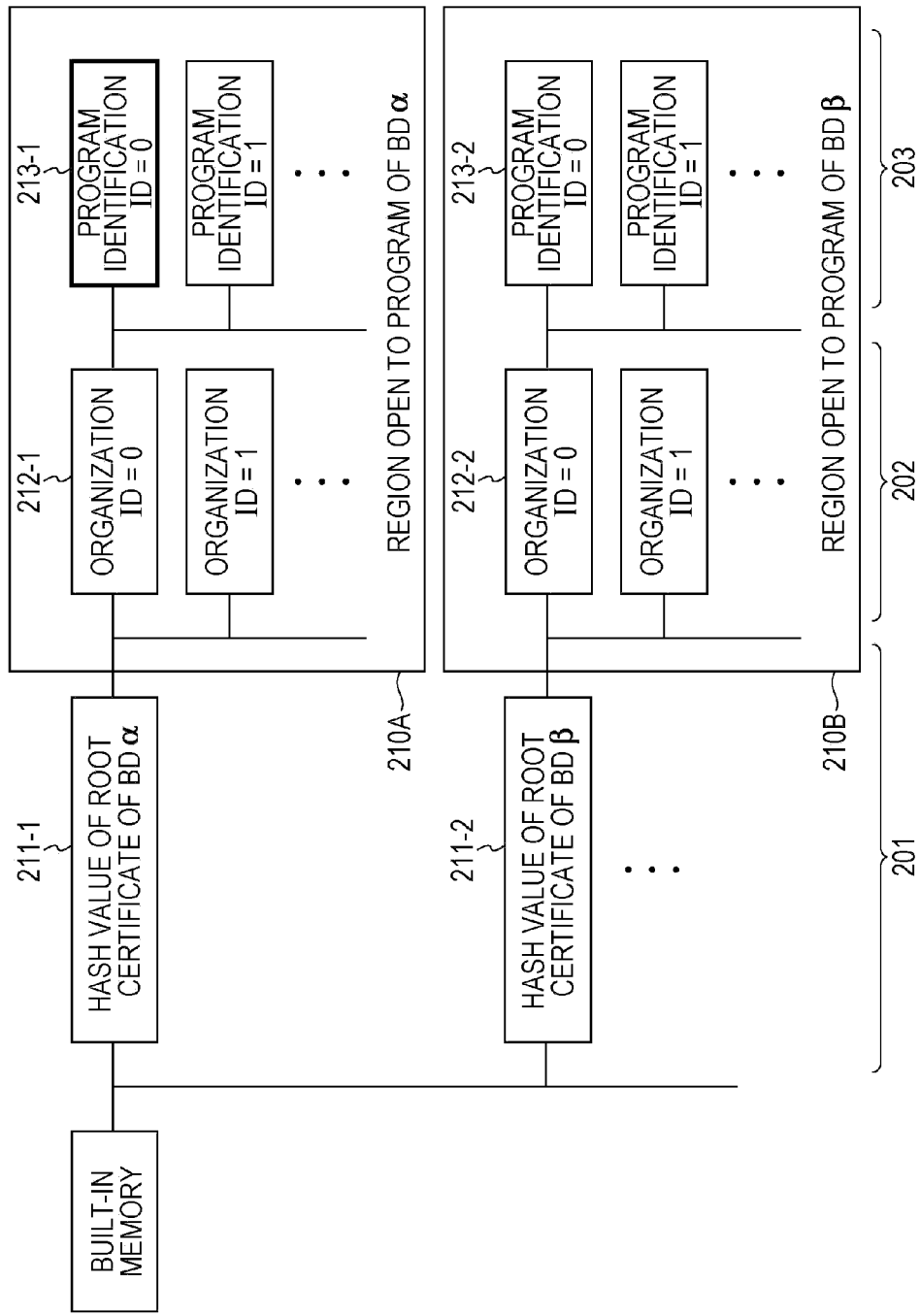
FIG. 5 is a diagram illustrating a hierarchical structure of folders provided in a built-in memory.

FIG. 5 illustrates a hierarchical structure of folders provided in the built-in memory 22 of the BD player 10.

In a first storage region layer 201 of the built-in memory 22, folders are provided for respective BDs 11 loaded into the BD player 10.

For example, in a case where a BD 11 called α (hereinafter referred to as BD 11-α) is loaded into the BD player 11, a folder 211-1 having a folder name which is the hash value uniquely derived on the basis of the root certificate 90 recorded on the BD 11-α is created in the first storage region layer 201.

Likewise, for example, in a case where a BD 11-β different from the BD 11-α is loaded into the BD player 11, a folder 211-2 having a folder name which is the hash value uniquely derived on the basis of the root certificate 90 recorded on the BD 11-β is created in the first storage region layer 201.

In a second storage region layer 202, which is in the lower layer of the folders 211 created in the first storage region layer 201, folders 212 having a folder name which is an organization ID are created, for example. Furthermore, in a third storage region layer 203 in the lower layer thereof, folders 213 having a folder name which is a program identification information ID are created, for example.

A communication record file or the like created by the application program 83 is stored in the folder 213.

The right to access the layered folders 211, 212, and 213 is controlled depending on the individual layers.

For example, with respect to the folder 211 created in the first storage region layer 201, only the application program 83 signed with the root certificate 90 from which the hash value serving as the folder name thereof can be derived has an access right.

In other words, the application program 83 of the BD 11-α has a right to access only the folder 211-1 in the first storage region layer 201, and does not have a right to access the folder 211-2. Likewise, the application program 83 of the BD 11-β has a right to access only the folder 211-2 in the first storage region layer 201, and does not have a right to access the folder 211-1.

Also, for example, the application program 83 that is recorded on the BD 11-α, that has an organization ID=0, and that has a program identification information ID=0 can read/write data, such as a communication record file, from/in the folder 213-1 in the third storage region layer 203. However, control can be performed so that the application program 83 can only read data, such as a communication record file, from the folder 213-2 positioned in the lower layer of the folder 212-1, and cannot write data therein.

FIG. 6 illustrates an example of a communication record file stored in the folder 213 in the third storage region layer 203. The communication record file is constituted by a communication record ID 231 for individually identifying the communication record file, and an expiration date 232 of the communication record file. The communication record ID 231 and the expiration date 232 are specified by the online shopping server 3 as an access destination.

FIG. 7 illustrates an example of a communication record list that is managed on the online shopping server 3 side. In the communication record list, communication record IDs 241, user IDs 242, and codes of items to be purchased 243 are recorded as records corresponding to individual communication record files stored in the built-in memory 22 of the BD player 10.

[Example of Data Recorded on BD to Which Recording Medium of the Present Invention is Applied]

Figure 8:
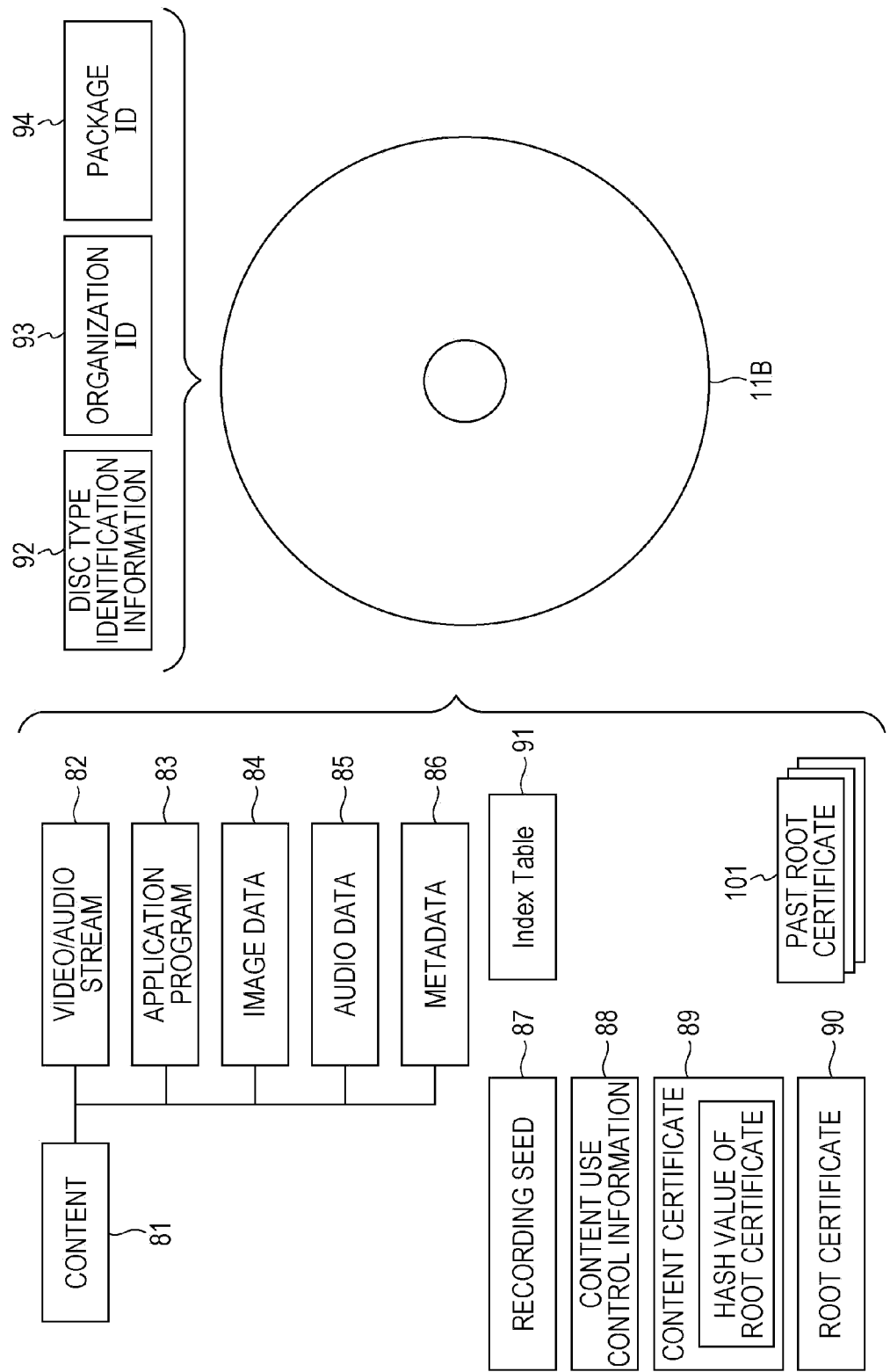
FIG. 8 is a diagram illustrating data recorded on a BD to which the present invention is applied.

Next, FIG. 8 illustrates an example of data stored in the BD 11 to which the present invention is applied (hereinafter referred to as BD 11B).

As for the BD 11B, an operation form of being distributed as a shopping catalog with the root certificate 90 being updated every season is assumed to be adopted. Note that the program identification ID and the organization ID of the application program 83 recorded thereon are not changed.

The BD 11B stores one or more past root certificates 101 that were issued before the (present) root certificate 90 for the application program 83 was issued, in addition to the data stored in the BD 11A illustrated in FIG. 4. Accordingly, the content certificate 89 additionally includes the hash values corresponding to the respective past root certificates 101.

Note that the application program 83 recorded on the BD 11B is not only signed with the (present) root certificate 90 but also signed with the past root certificates 101.

Here, when it is assumed that the BD 11B is a shopping catalog of a 2009 summer version, the past root certificates 101 correspond to the root certificate that was recorded as the (present) root certificate 90 on the BD 11 serving as a shopping catalog of a 2009 spring version that was distributed therebefore, the root certificate that was recorded as the (present) root certificate 90 on the BD 11 serving as a shopping catalog of a 2008 winter version, and the like.

Figure 9:
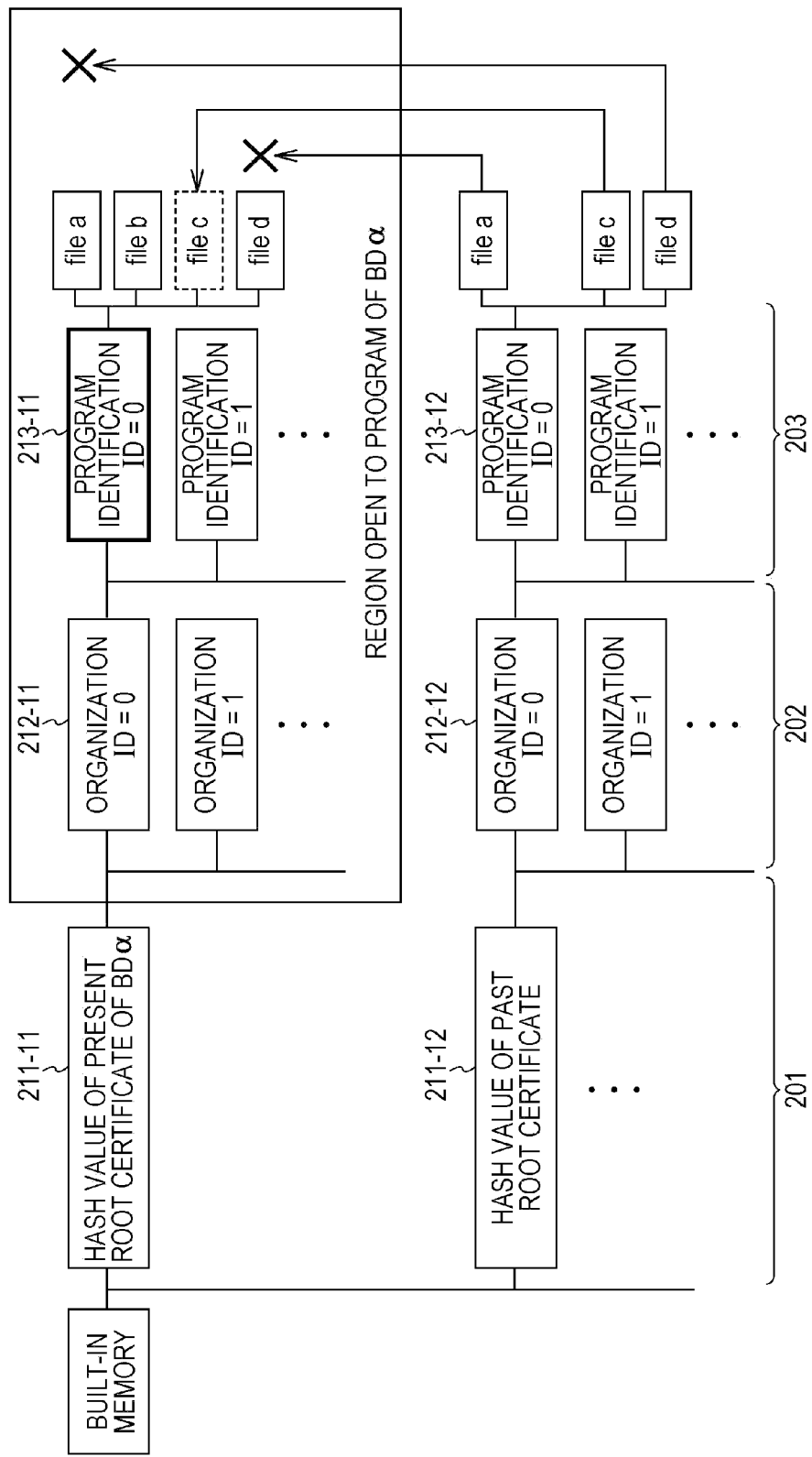
FIG. 9 is a diagram describing an outline of copying a file between folders in a lower layer of the built-in memory.

FIG. 9 illustrates a hierarchical structure of folders in the built-in memory 22 of the BD player 10 in a case where the BD 11B serving as a shopping catalog of a 2009 summer version is loaded thereinto.

As in the case described above with reference to FIG. 5, a folder 211-11 corresponding to the BD 11B of the 2009 summer version loaded into the BD player 10 is created in the first storage region layer 201 of the built-in memory 22. A hash value uniquely obtained on the basis of the root certificate 90 recorded on the BD 11B is adopted as the folder name of the folder 211-11.

Furthermore, a folder 212-11 corresponding to the organization ID is created in the second storage region layer 202 in the lower layer of the folder 211-11, and a folder 213-11 for the program identification ID is created in the third storage region layer 203 in the lower layer thereof.

Note that, in the BD player 10, if the BD 11 of the 2009 spring version has been used before using the BD 11B of the 2009 summer version, for example, a folder 211-12 corresponding to the BD 11 of the 2009 spring version must be created in the first storage region layer 201 of the built-in memory 22. The hash value of the root certificate 90 recorded on the BD 11 of the 2009 spring version (the same certificate as the past root certificate 101 recorded on the BD 11B) is adopted as the folder name of the folder 211-12.

A communication record file created by the application program 83 of the 2009 spring version, etc. is stored in a folder 213-12 in a lower layer of the folder 211-12. Thus, if the data stored in the folder 211-12 can be taken over by the application program 83 of the 2009 summer version, it is not necessary to cause a user to perform again an operation of inputting a user ID and so forth. However, the application program 83 of the 2009 summer version does not have a right to access the folder 211-12.

Accordingly, the built-in application 53 of the BD player 10 is capable of copying the data in the folder 211-12 to the folder 211-11 so that the application program 83 of the 2009 summer version can take over the data stored in the folder 211-12.

For example, as illustrated in FIG. 9, assume that three pieces of data (file a, file c, and file d) are stored in the folder 213-12 corresponding to the organization ID=0 and the program identification ID=0 in the lower layer of the folder 211-12 corresponding to the BD 11 of the 2009 spring version. Also, assume that three pieces of data (file a, file b, and file d) are stored in the same folder 213-11 in the lower layer of the folder 211-11 corresponding to the BD 11B of the 2009 summer version (the folder corresponding to the organization ID=0 and the program identification ID=0). In this case, overwrite copying is not performed on the data existing in the folder 213-11, but only the data not existing in the folder 213-11 in the data existing in the folder 213-12 is copied to the folder 213-11. Specifically, only the file c is copied to the folder 213-11, and the file a and the file d are not copied (this will be described in detail below with reference to FIG. 19).

Accordingly, the application program 83 of the 2009 summer version that has a right to access the folder 211-11 can take over a communication record file or the like created under the application program 83 of the 2009 spring version stored in the folder 211-12.

Note that, when the built-in application 53 accesses the folder 211-12, the past root certificate 101 recorded on the BD 11B is used.

[Operation of BD Player 10]

Next, the operation of the BD player 10 will be described.

Figure 10:
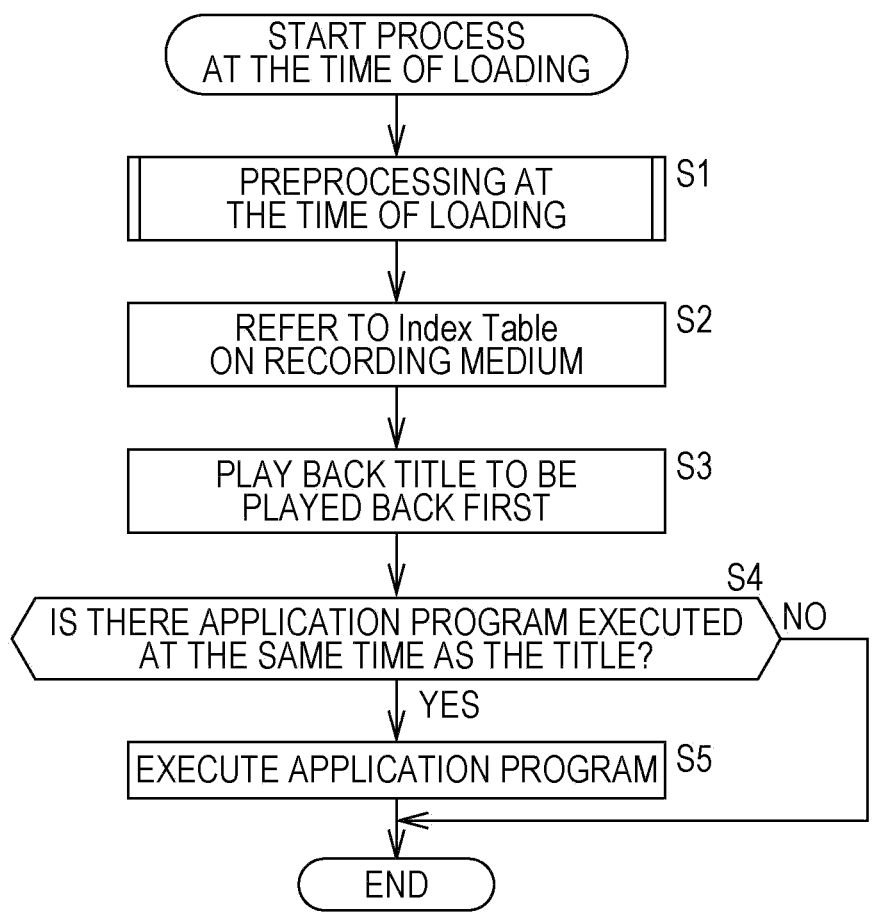
FIG. 10 is a flowchart describing a process at the time of loading.

FIG. 10 is a flowchart describing a process that is performed when the BD 11B is loaded into the BD player 10 (hereinafter referred to as a process at the time of loading).

After the BD 11B has been loaded, the built-in application 53 executes preprocessing at the time of loading in step S1. The preprocessing at the time of loading will be described below with reference to FIG. 19.

In step S2, the title management module 55 refers to the index table 91 recorded on the BD 11B, thereby recognizing the title to be played back first and notifying the title playback module 58 of the title. In response to this notification, the title playback module 58 plays back the video/audio stream 82 of the title (content 81) that should be played back first in step S3.

In step S4, the built-in application 53 determines whether or not the application program 83 that should be executed in association with the played back title is stored in the BD 11B. If it is determined that the application program 83 is stored, the process proceeds to step S5. In step S5, the external application execution management module 52 executes the external application 51 (that is, the application program 83) in accordance with the control performed by the built-in application 53. In accordance with the execution of the external application 51, an online shopping service is started, for example.

Note that, if it is determined in step S4 that the application program 83 that should be executed in association with the played back title is not stored in the BD 11B, step S5 is skipped, and the process at the time of loading ends.

Figure 11:
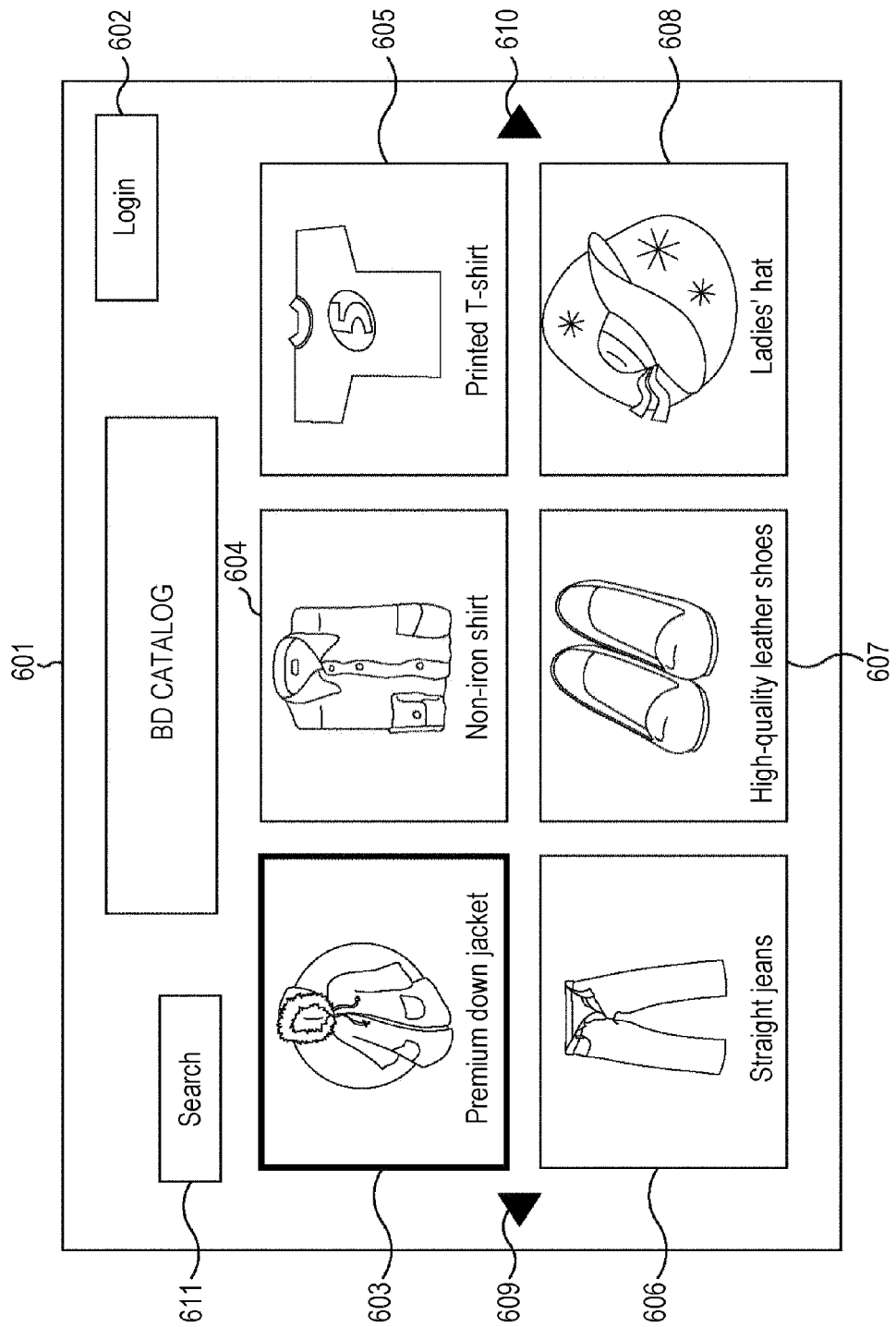
FIG. 11 is a diagram illustrating an example display of a top screen.

FIG. 11 illustrates an example display of a top screen 601 of the online shopping service that is started in accordance with the execution of the external application 51.

The top screen 601 is provided with a "Login" button 602 that is operated to display a login screen, and item buttons 603 through 608 that are operated to display detailed information of the respective items. Furthermore, the top screen 601 is provided with move buttons 609 and 610 that are operated to move to a page showing other items, and a "Search" button 611 that is operated to move to a screen for searching for items.

When a user operates the item buttons 603 through 608 on the top screen 601, a detailed information screen showing the detailed information of an item is displayed.

Figure 12:
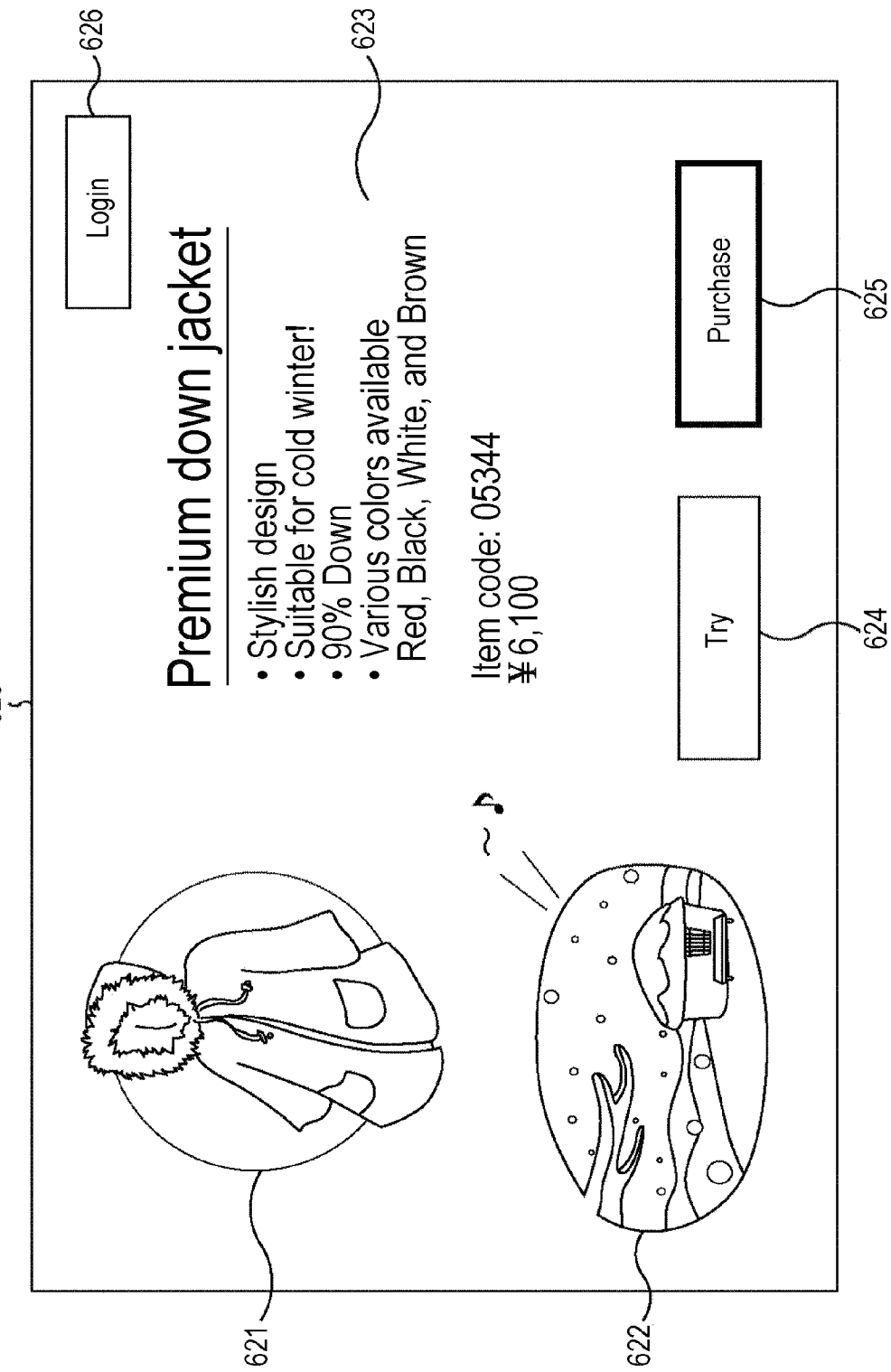
FIG. 12 is a diagram illustrating an example display of a detailed information screen.

FIG. 12 illustrates an example display of a detailed information screen 620 showing the detailed information about "Premium down jacket" that is displayed when the item button 603 is operated.

The detailed information screen 620 displays, for example, a photograph 621 of the item, a video 622 that introduces the item, and an introduction 623 including the description and price of the item. Also, the detailed information screen 620 displays a "Try" button 624 that is operated to display the item by superposing it on the image of the user himself/herself registered in advance, and a "Purchase" button 625 that is operated to purchase the item. Furthermore, the detailed information screen 620 is also provided with a "Login" button 626 that is operated to display a login screen.

When the user operates the "Purchase" button 625 on the detailed information screen 620, a list-of-items-to-be-purchased screen is displayed.

FIG. 13 illustrates an example display of a list-of-items-to-be-purchased screen 631 that is displayed when the user operates the "Purchase" button 625 on the detailed information screen 620 of "Premium down jacket".

The purchase list screen 631 displays an items-to-be-purchased list 632 showing the list of items selected as objects to be purchased by the user, detailed purchase information 633 including the price of the items to be purchased, a delivery charge, an amount discounted, a total price, etc., and other messages 634. Furthermore, the purchase list screen 631 is also provided with a "Login" button 635 that is operated to display a login screen.

If the user operates the "Login" button 602, 626, or 635 on the top screen 601, the detailed information screen 620, or the purchase list screen 631, a process at the time of login (this will be described in detail with reference to FIG. 18) is started.

During the process at the time of login, a login screen that allows the user to input a password and so forth is displayed only if a past communication record file concerning the online shopping server 3 is not detected. On the other hand, if a past communication record file concerning the online shopping server 3 is detected, the login screen is not displayed. Therefore, in this case, the time to input a user ID and a password by the user can be reduced.

Figure 14:
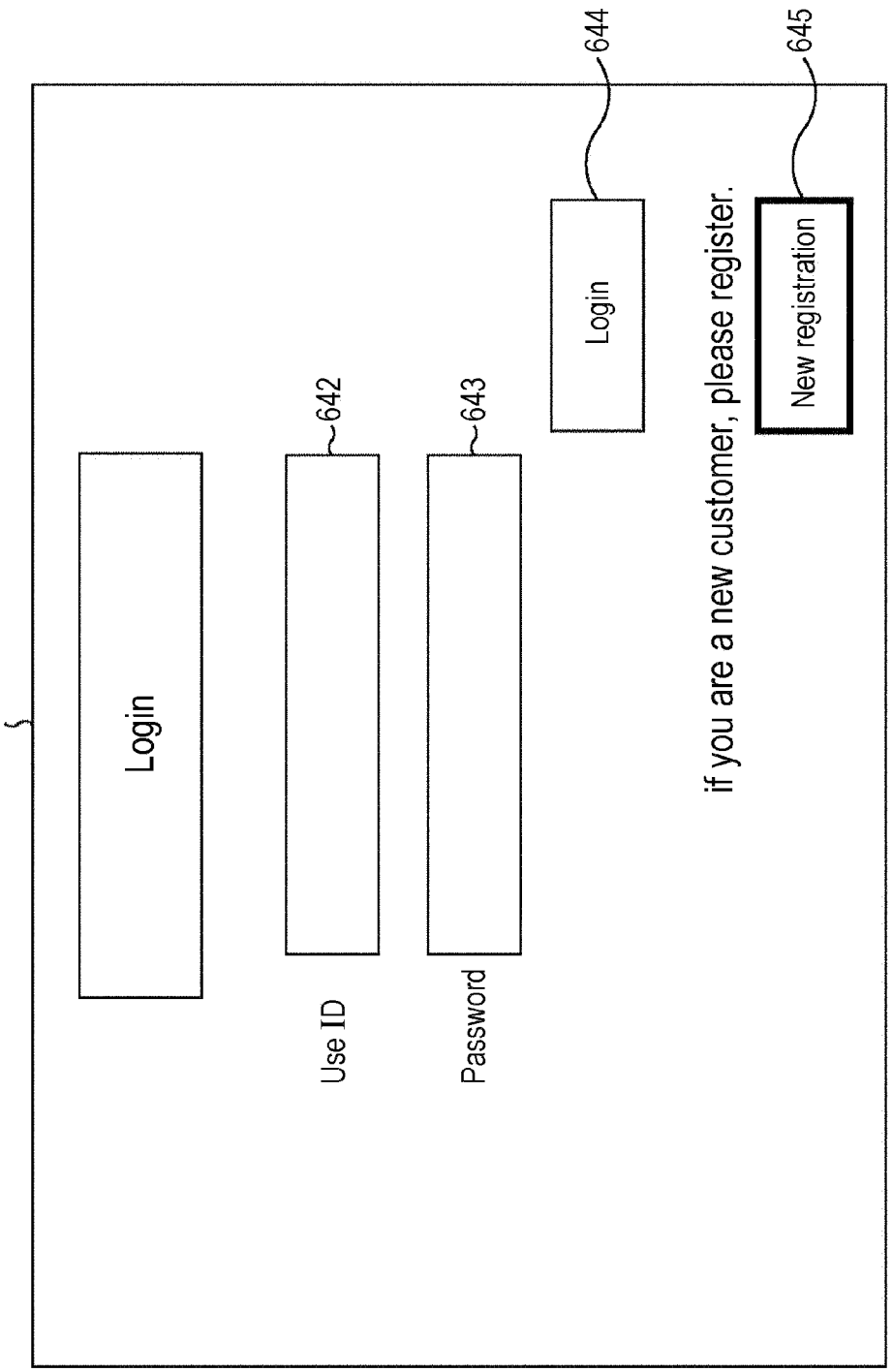
FIG. 14 is a diagram illustrating an example display of a login screen.

FIG. 14 illustrates an example display of a login screen 641 that is displayed only if a past communication record file is not detected when the "Login" button 635 is operated on the purchase list screen 631.

The login screen 641 is provided with a user ID input area 642, a password input area 643, and a "Login" 644 that is operated to transmit the input user ID and password. Furthermore, the login screen 641 is provided with a "New registration" button 645 that is operated to display a new registration screen for newly performing user registration.

On the login screen 641, a user who has performed user registration inputs a user ID and a password to the user ID input area 642 and the password input area 643, respectively, and operates the "Login" button 644, whereby a matching process is performed. Specifically, the user ID and the password are encrypted, are transmitted to the online shopping server 3, and undergo the matching with the information in the customer database 3b. Then, the login is completed after the user has been authenticated as being registered, and the screen display is changed to a post-login screen display.

Figure 15:
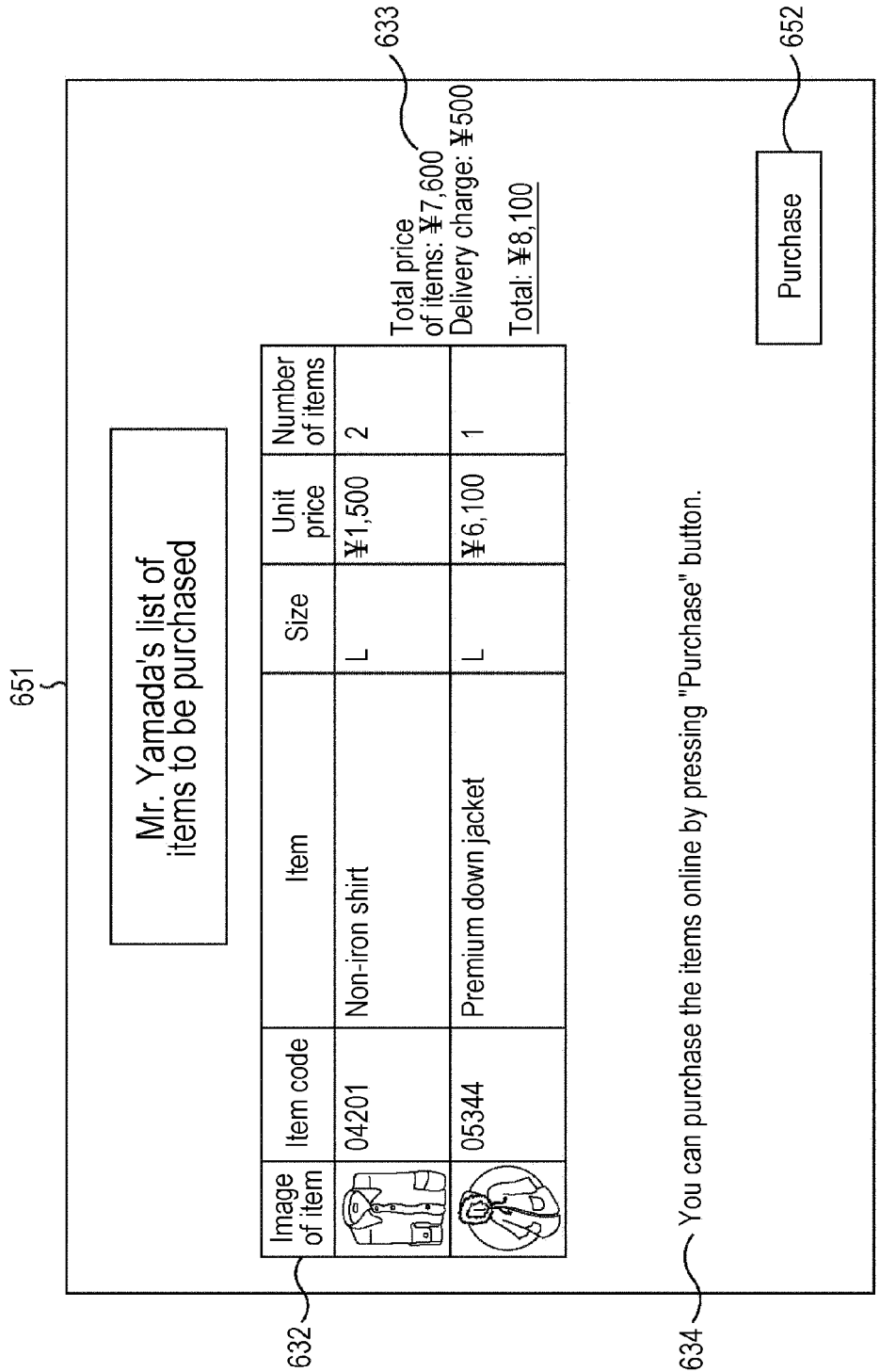
FIG. 15 is a diagram illustrating an example display of a list-of-items-to-be-purchased screen after login.

FIG. 15 illustrates an example display of a list-of-items-to-be-purchased screen 651 after login. The list-of-items-to-be-purchased screen 651 after login is provided with a "Purchase" button 652 instead of the "Login" button 635 on the list-of-items-to-be-purchased screen 631 (before login) illustrated in FIG. 13. The user who has logged in can provide an instruction to perform settlement using a credit card registered in advance, for example, by operating the "Purchase" button 652.

Figure 16:
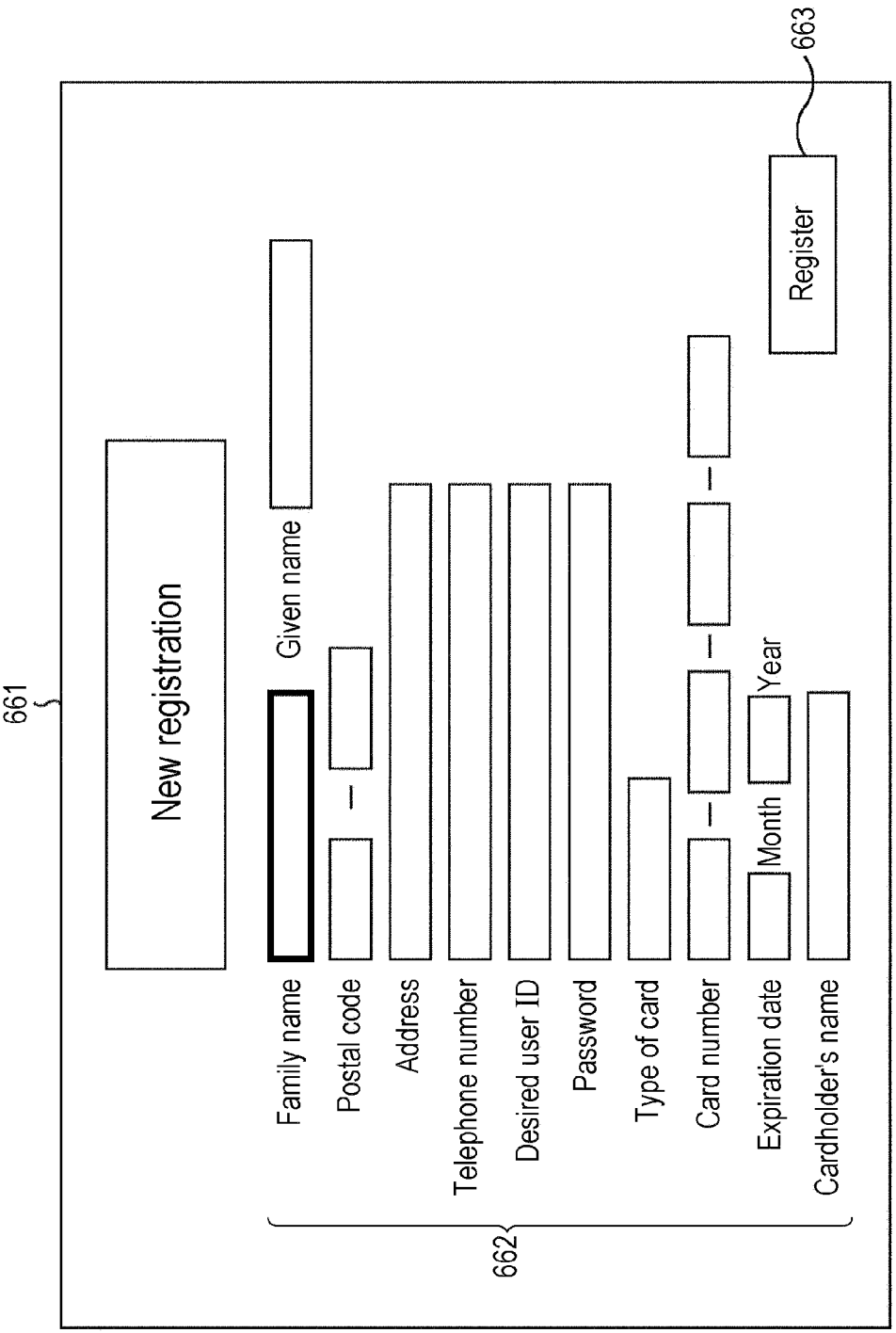
FIG. 16 is a diagram illustrating an example display of a new registration screen.

FIG. 16 illustrates an example display of a new registration screen 661 that is displayed when the "New registration" button 645 is operated on the login screen 641.

The new registration screen 661 is provided with a personal information input area 662 for inputting various pieces of personal information of a user, and a "Register" button 663 that is operated to transmit the input personal information.

When a user inputs his/her personal information in the personal information input area 662 and operates the "Register" button 663 on the new registration screen 661, new registration is performed.

Figure 17:
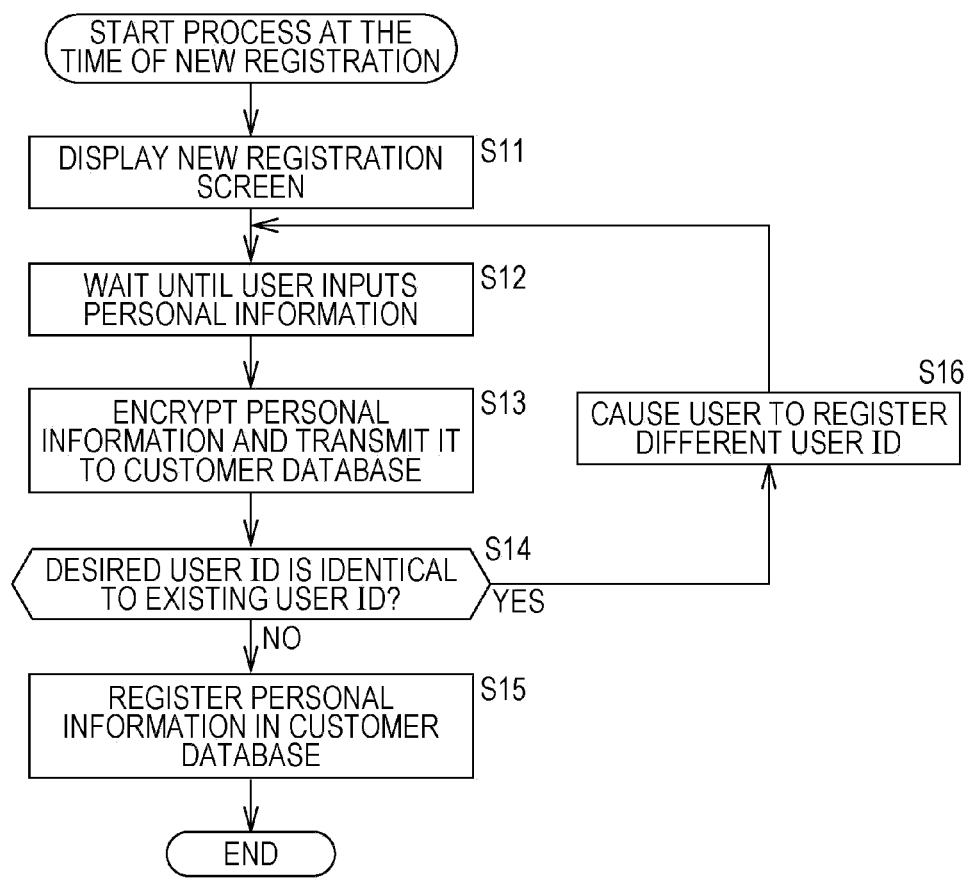
FIG. 17 is a flowchart describing a process at the time of new registration.

FIG. 17 is a flowchart describing a process at the time of new registration that is started when the "New registration" button 645 is operated.

In step S11, the external application 51 (that is, the application program 83) displays the new registration screen 661. In step S12, the external application 51 waits until the user inputs his/her personal information to the personal information input area 662 and operates the "Register" button 663. Then, after the personal information has been input and the "Register" button 663 has been operated, the process proceeds to step S13.

In step S13, the external application 51 encrypts the input personal information and transmits it to the customer database 3b of the online shopping server 3. In step S14, the customer database 3b to which the personal information is transmitted determines whether or not there is an already registered user ID identical to the desired user ID included in the transmitted personal information. If it is determined that there is no identical user ID, the customer database 3b registers the personal information of the new user in association with the desired user ID in step S15, and notifies the external application 51 that registration has been completed. The external application 51 that has received the notification notifies the user that the registration has been completed. In this way, the process at the time of new registration ends.

Note that, if it is determined in step S14 that there is an already registered user ID identical to the desired user ID included in the transmitted personal information, the process proceeds to step S16, where the user is caused to change the desired user ID. After that, the process returns to step S12, and the subsequent steps are repeated.

Figure 18:
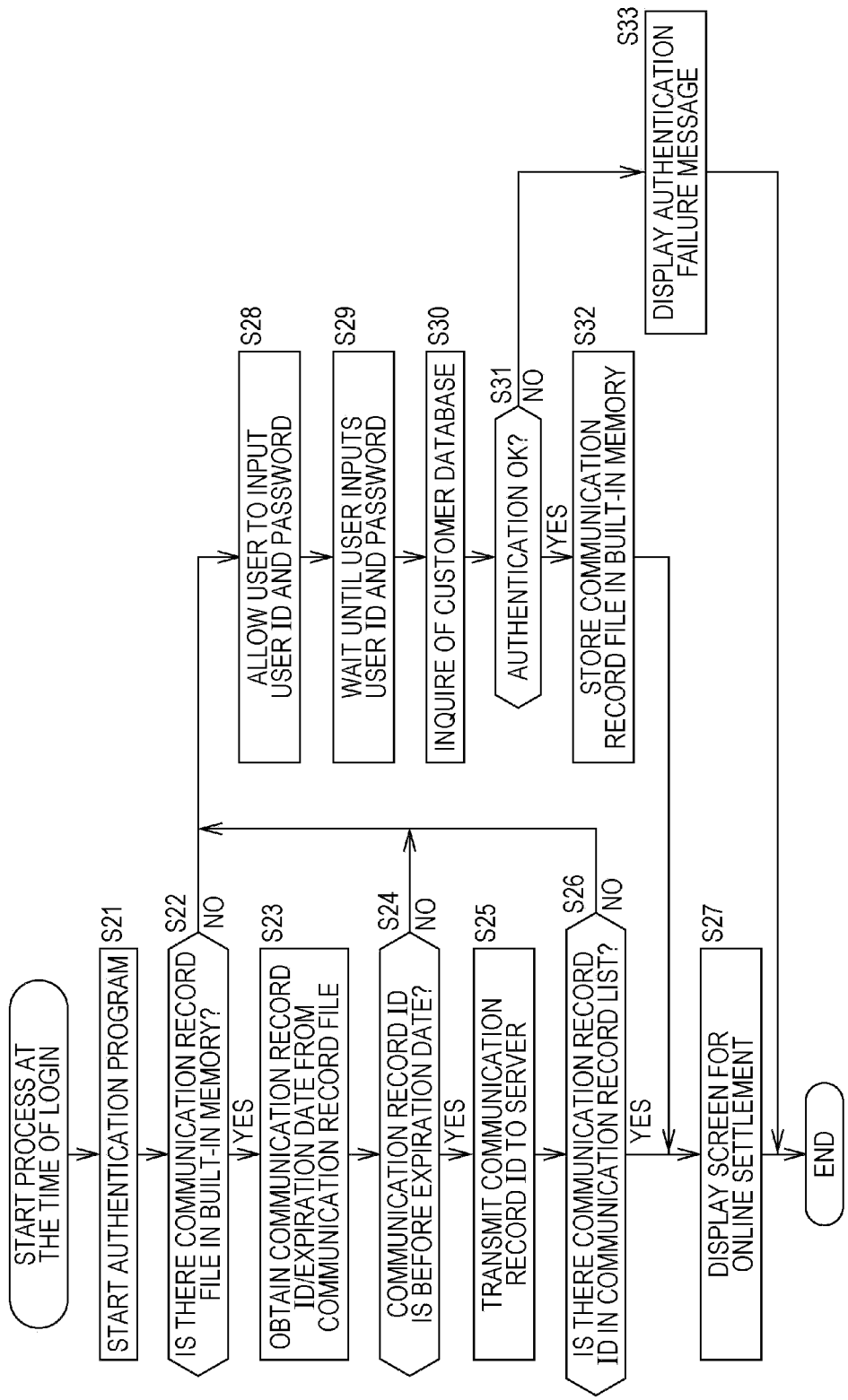
FIG. 18 is a flowchart describing a process at the time of login.

Next, FIG. 18 is a flowchart describing a process at the time of login that is started when the "Login" button 602, 626, or 635 is operated.

In step S21, the external application 51 starts an authentication program for executing user authentication. Note that this authentication program may be recorded on the BD 11B, or may be obtained from the online shopping server 3.

In step S22, the authentication program determines whether or not a communication record file concerning the online shopping server 3 exists in the folder for which the application program 83 of the BD 11B in the built-in memory 22 has an access right. If it is determined that the communication record file exists, the process proceeds to step S23, where the authentication program obtains the communication record ID and the expiration date of the existing communication record file from the folder via the application program 83.

In step S24, the authentication program determines whether or not the present time is before the expiration date. If the authentication program determines that the present time is before the expiration date, the authentication program encrypts the communication record ID and notifies the online shopping server 3 of it in step S25.

In response to this notification, in step S26, the online shopping server 3 determines whether or not the notified communication record ID exists in the communication record list managed therein. If it is determined that the communication record ID exists, the process proceeds to step S27, where the online shopping server 3 notifies the authentication program that the user authentication has been completed. The external application 51 that has received this notification via the authentication program displays a post-login screen (for example, the list-of-items-to-be-purchased screen 651 after login in FIG. 15). In this way, the process at the time of login ends.

Note that, if it is determined in step S22 that the communication record file does not exist in the folder for which the application program 83 of the BD 11B in the built-in memory 22 has an access right, the process proceeds to step S28.

Also, if it is determined in step S24 that the present time is not before the expiration date, the process proceeds to step S28.

Furthermore, if it is determined in step S26 that the notified communication record ID does not exist in the communication record list managed by the online shopping server 3, the process proceeds to step S28.

In step S28, the external application 51 displays the login screen 641 (FIG. 14) for allowing a user ID and a password to be input, and allows the user to input them. In step S29, the external application 51 waits until the user inputs the user ID and the password and operates the "Login" button 644. Then, after the user ID and the password have been input and the "Login" button 644 has been pressed, the process proceeds to step S30.

In step S30, the authentication program encrypts the input user ID and password, and inquires of the customer database 3b of the online shopping server 3. In response to the inquiry, the customer database 3b determines whether or not the user ID and the password have been registered in step S31. If it is determined that the user ID and the password in the inquiry have been registered, the process proceeds to step S32.

In step S32, the customer database 3b notifies the authentication program that the user ID and password in the inquiry have been registered. The external application 51 that has received this notification via the authentication program newly generates a communication record file and stores it in the folder for which the external application 51 has an access right in the built-in memory 22. After that, the process proceeds to step S27.

Note that, if it is determined in step S31 that the user ID and password in the inquiry have not been registered, the process proceeds to step S33. In step S33, the customer database 3b notifies the authentication program that the user ID and password in the inquiry have not been registered. The external application 51 that has received this notification via the authentication program displays a message representing the failure of authentication. After that, a message for allowing the user to re-input the user ID and the password or to perform new registration is displayed, and the process at the time of login ends.

Next, the preprocessing at the time of loading in step S1 in the above-described process at the time of loading will be described with reference to FIG. 19.

Figure 19:
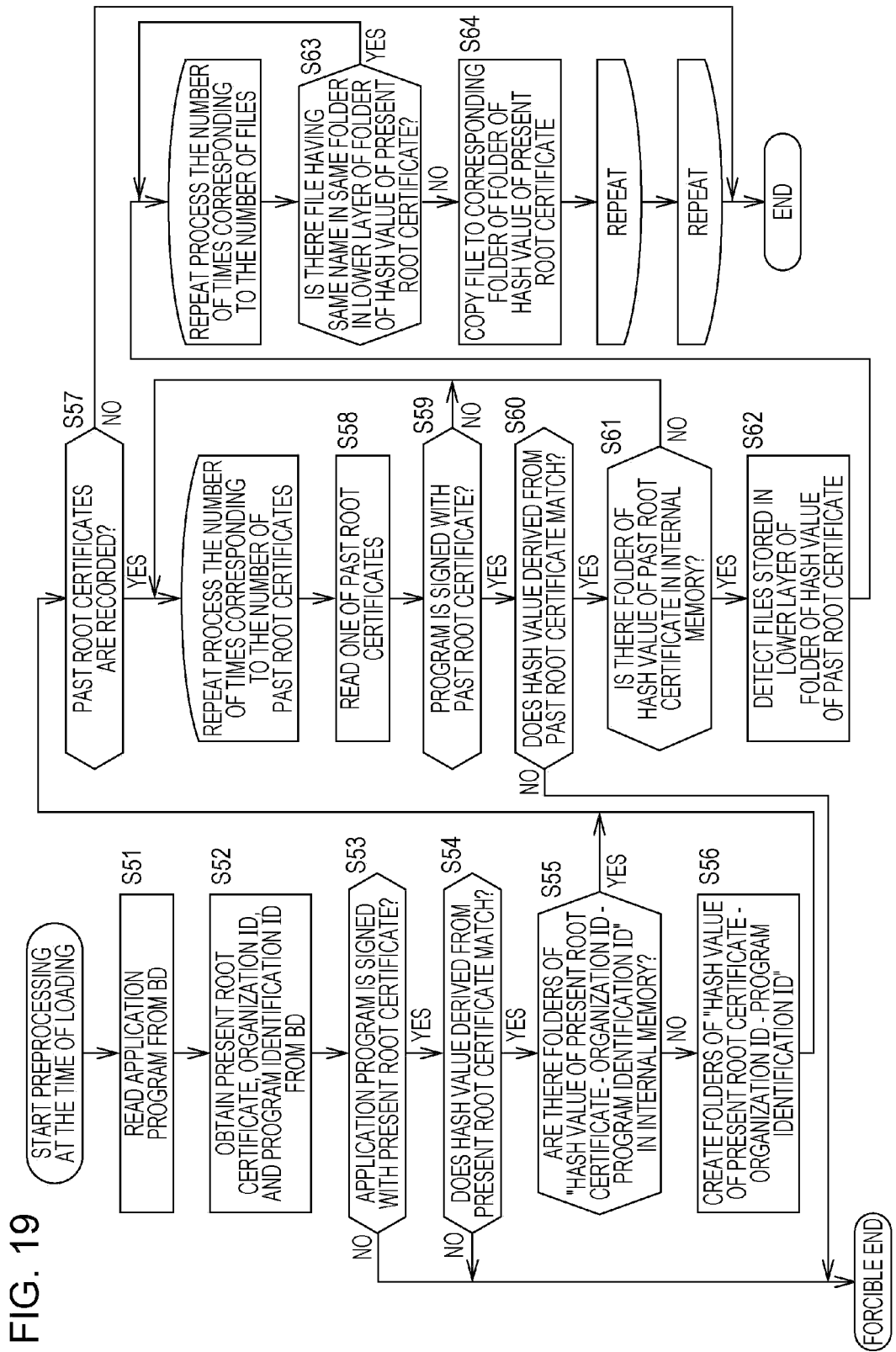
FIG. 19 is a flowchart describing preprocessing at the time of loading.

FIG. 19 is a flowchart describing the preprocessing at the time of loading.

In step S51, the built-in application 53 reads the application program 83 (the external application 51) recorded on the loaded BD 11 (BD 11A or BD 11B). In step S52, the built-in application 53 obtains the (present) root certificate 90, the organization ID 93, and the program identification ID of the application program 83 from the loaded BD 11.

In step S53, the built-in application 53 determines whether or not the read application program 83 is signed with the (present) root certificate 90. The process proceeds to step S54 only if it is determined that the read application program 83 is signed with the (present) root certificate 90.

Note that, if it is determined that the read application program 83 is not signed with the (present) root certificate 90, the BD 11 is not legitimate, and thus the preprocessing at the time of loading and the process at the time of loading are forcibly ended.

In step S54, the hash value derivation unit 53*a* of the built-in application 53 derives the hash value of the (present) root certificate 90. Furthermore, the hash value derivation unit 53*a* determines whether or not the derived hash value matches the hash value of the root certificate 90 included in the content certificate 89 recorded on the BD 11. Then, the process proceeds to step S55 only if the both hash values match.

Note that, if it is not determined that the both hash values match, the BD 11 is not legitimate, and thus the preprocessing at the time of loading and the process at the time of loading are forcibly ended.

In step S55, the folder creation unit 53*b* of the built-in application 53 determines whether or not a folder on which read/write can be performed by only the application program 83 (corresponding to the folder 213-11 in FIG. 9) exists in the third recording layer 203 of the internal memory 22. If it is determined that the folder does not exist, the process proceeds to step S56, where the folder creation unit 53*b* creates the folder. At this time, the folder creation unit 53*b* also creates the folders corresponding to the first recording layer 201 and the second recording layer 201 (corresponding to the folders 211-11 and 212-11 in FIG. 9) as necessary.

Note that, if it is determined in step S55 that the folder exists in the third recording layer 203 of the internal memory 22, step S56 is skipped and the process proceeds to step S57.

In step S57, the built-in application 53 determines whether or not the past root certificates 101 are recorded on the loaded BD 11. If it is determined that the past root certificates 101 are not recorded (that is, the loaded BD 11 is the BD 11A), the preprocessing at the time of loading is ended, and the process returns to step S2 of the process at the time of loading.

If it is determined in step S57 that the past root certificates 101 are recorded (that is, the loaded BD 11 is the BD 11B), the process proceeds to step S58. Note that the process from step S58 through step S64 is repeated the number of times corresponding to the number of past root certificates 101 recorded on the loaded BD 11B.

In step S58, the built-in application 53 obtains one of the past root certificates 101 from the loaded BD 11B. In step S59, the built-in application 53 determines whether or not the application program 83 read in step S51 is signed with the obtained past root certificate 101. The process proceeds to step S60 only if it is determined that the application program 83 is signed.

Note that, if it is determined that the application program 83 is not signed with the past root certificate 101, the process returns to step S58, and the subsequent steps are repeated.

In step S60, the hash value derivation unit 53*a* of the built-in application 53 derives the hash value of the past root certificate 101 obtained in step S58. Furthermore, the hash value derivation unit 53*a* determines whether or not the derived hash value matches the hash value of the past root certificate 101 included in the content certificate 89 recorded on the BD 11B. Then, the process proceeds to step S61 only if it is determined that the both hash values match.

Note that, if it is not determined that the both hash values match, the BD 11B is not legitimate, and thus the preprocessing at the time of loading and the process at the time of loading are forcibly ended.

In step S61, the folder creation unit 53*b* of the built-in application 53 determines whether or not a folder having a folder name which is the hash value of the past root certificate 101 obtained in step S58 exists in the first recording layer 201 of the internal memory 22. If it is determined that the folder having a folder name which is the hash value of the past root certificate 101 obtained in step S58 exists in the first recording layer 201 of the internal memory 22, the process proceeds to step S62.

Note that, if it is determined that the folder having a folder name which is the hash value of the past root certificate 101 obtained in step S58 does not exist in the first recording layer 201 of the built-in memory 22, the process returns to step S58, and the subsequent steps are repeated.

In step S62, the copying control unit 53*c* of the built-in application 53 detects files (for example, a communication record file etc.) stored in the lower layer of the folder that is determined to exist in step S61 in the first recording layer 201 of the built-in memory 22. Note that the process of steps S63 and S64 is repeated the number of times corresponding to the number of files detected in step S62.

In step S63, the copying control unit 53*c* regards one of the files detected in step S62 as a target, and determines whether or not a file having the same file name as the target file exists in a directory similar to the directory of the target file in the lower layer of the folder corresponding to the hash value of the (present) root certificate 90 provided in the first recording layer 201 of the built-in memory 22. If it is determined that the file exists, the file is not copied.

The process proceeds to step S64 only if it is determined in step S63 that the file does not exist. In step S64, the copying control unit 53*c* copies the target file to the directory similar to the directory of the target file in the lower layer of the folder corresponding to the hash value of the (present) root certificate 90 provided in the first recording layer 201 of the built-in memory 22.

As described above, after the process from step S58 through step S64 is repeated the number of times corresponding to the number of the past root certificates 101 recorded on the loaded BD 11B, the preprocessing at the time of loading ends, and the process returns to step S2 of the process at the time of loading.

As described above, according to the preprocessing at the time of loading, a file stored in a layer lower than the folder associated with the past root certificate 101 can be taken over by the application program 83 of the loaded BD 11B.

Accordingly, the user can save time to input a user ID and a password at the time of login, for example.

Also, not only a communication record file in an online shopping service, but also information including a keyword registered by a user can be taken over.

Furthermore, for example, in a case where the application program of the same game is recorded on a plurality of different BDs 11B having movie content recorded thereon, information about a high score in the game can be shared.

Note that the recording medium of the present invention is not limited to the BD, and may be applied to a recording medium that is sold or distributed as a packaged medium.

Also, the information processing apparatus of the present invention is not limited to the BD player, and may be applied to various electronic apparatuses that process information on the recording medium to which the recording medium of the present invention is applied.

Additionally, the above-described series of processes can be executed by hardware and also can be executed by software.

Note that the embodiment of the present invention is not limited to the above-described embodiment, and various changes can be achieved without deviating from the gist of the present invention.

Reference Signs List

10 BD player, 11 BD, 20 CPU, 22 built-in memory, 51 external application, 52 external application execution management module, 53 built-in application, 53*a* hash value derivation unit, 53*b* folder creation unit, 53*c* copying control unit, 89 content certificate, 90 root certificate, 101 past root certificate

The invention claimed is:

1. An information processing apparatus, comprising:
one or more processors operable to:
read an application program recorded on an optical disc, wherein the optical disc comprises:
a current version of the application program serving as content,
a first root certificate that is issued to the current version of the application program, and
a second root certificate that is issued to another version of the application program recorded on another optical disc, the another optical disc including the second root certificate, wherein the second root certificate is issued to the another version of the application program before the first root certificate is issued to the current version of the application program;
create, in a memory, a first folder for storing data to be processed by the current version of the application program, the first folder being associated with the first root certificate; and
copy, based on determining whether the second root certificate is recorded on the optical disc, a communication record stored in a second folder to the first folder when the second folder exists in the memory, the second folder being associated with the second root certificate, wherein data stored in the second folder that corresponds to the another version is merged with the data stored in the first folder that corresponds to the current version based on the communication record copied to the first folder.

2. The information processing apparatus according to claim 1, wherein the one or more processors are operable to: derive hash values from the first and second root certificates recorded on the optical disc.

3. The information processing apparatus according to claim 1, wherein the one or more processors are operable to:
create, in the memory, the first folder associated with a hash value derived from the first root certificate; and
copy the data stored in the second folder to the first folder when the second folder associated with a hash value derived from the second root certificate exists in the memory.

4. The information processing apparatus according to claim 1,
wherein a first hash value corresponding to the first root certificate and a second hash value corresponding to the second root certificate are recorded on the optical disc,
wherein the one or more processors are operable to create, in the memory, the first folder associated with a hash value derived from the first root certificate when the hash value derived from the first root certificate is equal to the first hash value recorded on the optical disc, and
copy the data stored in the second folder to the first folder when another hash value derived from the second root certificate is equal to the second hash value recorded on the optical disc, wherein the second folder associated with the another hash value derived from the second root certificate exists in the memory.

5. The information processing apparatus according to claim 1, wherein the memory is a built-in memory provided in the information processing apparatus.

6. The information processing apparatus according to claim 1, wherein the memory is an external memory that is removably loaded into the information processing apparatus.

7. The information processing apparatus according to claim 1,
wherein the one or more processors are operable to copy, to the first folder, only a piece of the data stored in the second folder having a file name different from the data stored in the first folder when the second folder associated with the second root certificate exists in the memory.

8. The information processing apparatus according to claim 1,
wherein a plurality of different second root certificates are recorded on the optical disc, and
wherein the one or more processors are operable to copy, when a plurality of second folders associated with the plurality of different second root certificates exist in the memory, data stored in the plurality of second folders to the first folder.

9. The information processing apparatus according to claim 1, wherein the one or more processors are operable to:
create, in the memory, the first folder associated with a hash value derived from the first root certificate; and
copy the data stored in the second folder to the first folder when the second folder associated with another hash value derived from the second root certificate exists in the memory.

10. The information processing apparatus of claim 1, wherein the current version of the application program is an update of the another version of the application program.

11. An information processing method, comprising:
in an information processing apparatus:
reading an application program from an optical disc, wherein the optical disc comprises:
a current version of the application program serving as content, a first root certificate that is issued to the current version of the application program, and a second root certificate that is issued to another version of the application program recorded on another optical disc, the another optical disc including the second root certificate, wherein the second root certificate is issued to the another version of the application program before the first root certificate is issued to the current version of the application program;

creating, in a memory, a first folder associated with the first root certificate to store data to be processed by the current version of the application program; and copying, based on determining whether the second root certificate is recorded on the optical disc, a communication record stored in a second folder to the first folder when the second folder exists in the memory, the second folder being associated with the second root certificate, wherein data stored in the second folder that corresponds to the another version is merged with the data stored in the first folder that corresponds to the current version based on the communication record copied to the first folder.

12. A non-transitory computer-readable storage medium having stored thereon, a computer program having at least one code section, the at least one code section being executable by a computer for causing the computer to perform steps comprising:

reading an application program from an optical disc, wherein the optical disc comprises:

a current version of the application program serving as content, a first root certificate that is issued to the current version of the application program, and a second root certificate that is issued to another version of the application program recorded on another optical disc, the another optical disc including the second root certificate, wherein the second root certificate is issued to the another version of the application program before the first root certificate is issued to the current version of the application program;

creating, in a memory, a first folder associated with the first root certificate to store data to be processed by the current version of the application program; and copying, based on determining whether the second root certificate is recorded on the optical disc, a communication record stored in a second folder to the first folder when the second folder exists in the memory, the second folder being associated with the second root certificate, wherein data stored in the second folder that corresponds to the another version is merged with the data stored in the first folder that corresponds to the current version based on the communication record copied to the first folder.

* * * * *